United States Patent
Kawate

(10) Patent No.: US 10,516,152 B2
(45) Date of Patent: Dec. 24, 2019

(54) ENERGY STORAGE DEVICE

(71) Applicant: Lithium Energy and Power GmbH & Co. KG, Stuttgart (DE)

(72) Inventor: Kenji Kawate, Kyoto (JP)

(73) Assignee: GS YUASA INTERNATIONAL LTD., Kyoto-Shi, Kyoto (JP)

( * ) Notice: Subject to any disclaimer, the term of this patent is extended or adjusted under 35 U.S.C. 154(b) by 0 days.

(21) Appl. No.: 15/760,595

(22) PCT Filed: Jul. 26, 2016

(86) PCT No.: PCT/EP2016/067708
§ 371 (c)(1),
(2) Date: Mar. 15, 2018

(87) PCT Pub. No.: WO2017/045813
PCT Pub. Date: Mar. 23, 2017

(65) Prior Publication Data
US 2019/0044124 A1    Feb. 7, 2019

(30) Foreign Application Priority Data
Sep. 18, 2015    (JP) ................... 2015-186095

(51) Int. Cl.
| H01M 4/02 | (2006.01) |
| H01M 2/36 | (2006.01) |
| H01M 10/0587 | (2010.01) |
| H01G 11/26 | (2013.01) |
| H01G 11/58 | (2013.01) |
| H01G 11/66 | (2013.01) |

(Continued)

(52) U.S. Cl.
CPC .............. *H01M 2/36* (2013.01); *H01G 11/26* (2013.01); *H01G 11/58* (2013.01); *H01G 11/66* (2013.01); *H01G 11/78* (2013.01); *H01M 2/362* (2013.01); *H01M 10/0431* (2013.01); *H01M 10/0587* (2013.01); *H01M 2220/20* (2013.01)

(58) Field of Classification Search
CPC ...................................... H01M 4/02
See application file for complete search history.

(56) References Cited

U.S. PATENT DOCUMENTS

2008/0233474 A1    9/2008  Son et al.
2013/0236756 A1*   9/2013  Wang ............... H01M 4/72
                                              429/94

FOREIGN PATENT DOCUMENTS

| JP | 2003-317703 A | 11/2003 |
| JP | 2007-250413 A | 9/2007 |
| JP | 2008-171583 A | 7/2008 |

(Continued)

OTHER PUBLICATIONS

International Search Report (ISR) (PCT Form PCT/ISA/210), in PCT/EP2016/067708, dated Sep. 8, 2016.

(Continued)

*Primary Examiner* — Jacob B Marks
(74) *Attorney, Agent, or Firm* — McGinn I.P. Law Group, PLLC.

(57) ABSTRACT

An energy storage device includes: an electrode assembly; and a container for housing the electrode assembly, wherein an electrolyte solution filling opening from which electrolyte solution is to be filled into the container is formed in a position of a wall portion of the container and facing a tab portion of the electrode assembly.

19 Claims, 7 Drawing Sheets

(51) Int. Cl.
*H01G 11/78* (2013.01)
*H01M 10/04* (2006.01)

(56) References Cited

FOREIGN PATENT DOCUMENTS

| | | |
|---|---|---|
| JP | 2012-049039 A | 3/2012 |
| JP | 2013-168239 A | 8/2013 |

OTHER PUBLICATIONS

International Search Report (ISR) (PCT Form PCT/ISA/210), in PCT/EP2016/067708, dated Aug. 9, 2016.

\* cited by examiner

ENERGY STORAGE DEVICE

TECHNICAL FIELD

The present invention relates to an energy storage device including an electrode assembly and a container for housing the electrode assembly.

BACKGROUND ART

Conventionally, there is a known structure in which an electrolyte solution filling opening from which electrolyte solution is to be filled into a container is provided to a container in an energy storage device including an electrode assembly and the container for housing the electrode assembly. For example, Patent Document 1 discloses a battery including a battery container for housing a power generating element, a lid body for sealing an opening portion of the battery container, and an electrolyte solution filling opening which is formed in the lid body and from which electrolyte solution is to be filled. In this battery, a positive electrode lead of the power generating element is welded to the container and the electrolyte solution filling opening provided to the container is sealed with a positive electrode terminal. In other words, the positive electrode terminal also performs a function of sealing the electrolyte solution filling opening.

PRIOR ART DOCUMENT

Patent Document

Patent Document 1: JP-A-2003-317703

SUMMARY OF THE INVENTION

Problems to be Solved by the Invention

An electrode assembly of an energy storage device has a structure formed by layering positive electrodes and negative electrodes with separators sandwiched therebetween, for example. From a viewpoint of preventing entry of foreign matters such as metal pieces into the electrode assembly, an end portion of the electrode assembly is preferably closed as fully as possible. On the other hand, however, it is necessary to cause the electrolyte solution filled into the container from the electrolyte solution filling opening to efficiently penetrate active material layers of the positive electrodes, active material layers of the negative electrode, and the separators in the electrode assembly, respectively.

In view of the above conventional problem, it is an object of the present invention to provide an energy storage device which includes an electrode assembly and a container for housing the electrode assembly and in which electrolyte solution filled from an electrolyte solution filling opening formed in the container can efficiently penetrate the electrode assembly.

Means for Solving the Problems

To achieve the above object, according to an aspect of the present invention, there is provided an energy storage device including an electrode assembly and a container for housing the electrode assembly, wherein an electrolyte solution filling opening from which electrolyte solution is to be filled into the container is formed in a position of a wall portion of the container and facing a tab portion of the electrode assembly.

With this structure, because the tab portion exists in the position facing the electrolyte solution filling opening, the electrolyte solution which has been filled from the electrolyte solution filling opening immediately reaches the tab portion. The tab portion is a portion formed by layering portions of a substrate of an electrode (a positive electrode or a negative electrode) and not coated with active material (active material uncoated portions) and a portion of the tab portion is joined to a conductive member such as a current collector. Therefore, the electrolyte solution filled from the electrolyte solution filling opening arranged at the position facing the tab portion goes down the tab portion and efficiently penetrates the electrode assembly (more specifically, active material layers of the positive electrode and the negative electrode and separators in the electrode assembly).

Moreover, at an end portion of the electrode assembly other than the tab portion, end edges of the separators may be bent, or a structure may be disposed, for example, to take measures against entry of foreign matters. In other words, in the energy storage device according to the aspect, the electrolyte solution can efficiently penetrate the electrode assembly and the entry of the foreign matters into the electrode assembly can be suppressed.

The energy storage device according to an aspect of the present invention may further include the current collector disposed in the container and electrically connected to the tab portion and an insulating member disposed between the current collector and the wall portion of the container, wherein a through hole may be formed in a position of the insulating member and between the electrolyte solution filling opening and the tab portion.

With this structure, the insulating member for electrically insulating the current collector and the wall portion formed with the electrolyte solution filling opening from each other can be disposed in such a manner as not to obstruct a flow of the electrolyte solution filled from the electrolyte solution filling opening. In other words, the electrolyte solution filling opening is disposed in the position facing the tab portion and therefore the insulating member for insulating the current collector electrically connected to the tab portion and the wall portion from each other may be disposed in such a position as to overlap the electrolyte solution filling opening when seen in a direction in which the electrolyte solution is filled in some cases. In this case, by forming the through hole in the position of the insulating member between the electrolyte solution filling opening and the tab portion, it is possible to cause the electrolyte solution filled from the electrolyte solution filling opening to reach the tab portion through the through hole.

Moreover, the energy storage device according to an aspect of the present invention may further include a spacer disposed between an end portion of the electrode assembly provided with the tab portion and the wall portion of the container, wherein the spacer may have an opening portion through which the tab portion is inserted.

With this structure, while disposing the spacer having functions of restricting a position of the electrode assembly, preventing a short circuit between the electrode assembly and the conductive member, and suppressing the entry of the foreign matters into the electrode assembly between the end portion of the electrode assembly provided with the tab portion and the container, it is possible to cause the electrolyte solution filled from the electrolyte solution filling opening to immediately reach the tab portion.

In the energy storage device according to an aspect of the present invention, the electrode assembly may be formed by winding the electrode and the electrolyte solution filling opening may be formed in the wall portion of the container and positioned in a direction of a winding axis of the electrode assembly.

With this structure, the electrolyte solution filling opening is disposed in the wall portion positioned in the direction of the winding axis of the electrode assembly. Therefore, the electrolyte solution can penetrate the inside of the electrode assembly from the tab portion and the electrolyte solution accumulating on a bottom of the container (on a wall portion facing the wall portion provided with the electrolyte solution filling opening) can penetrate the inside of the electrode assembly from an end portion on an opposite side from the tab portion in the direction of the winding axis.

Advantages of the Invention

According to the present invention, it is possible to provide the energy storage device including the electrode assembly and the container for housing the electrode assembly, in which the electrolyte solution filled from the electrolyte solution filling opening formed in the container can efficiently penetrate the electrode assembly.

MODES FOR CARRYING OUT THE INVENTION

With reference to the drawings, an energy storage device according to an embodiment of the present invention will be described below. The respective drawings are schematic diagrams and are not necessarily accurate depictions.

The embodiment described below shows a specific example of the present invention. Shapes, materials, components, disposed positions and manners of connection of the components, an order of manufacturing steps, and the like shown in the following embodiment are merely examples and not intended to limit the present invention. Out of the components in the following embodiment, those which are not described in independent claims describing the most generic concept will be described as optional components.

First, by using FIGS. 1 to 3, an energy storage device 10 according to the embodiment will be described generally.

Figure 1:
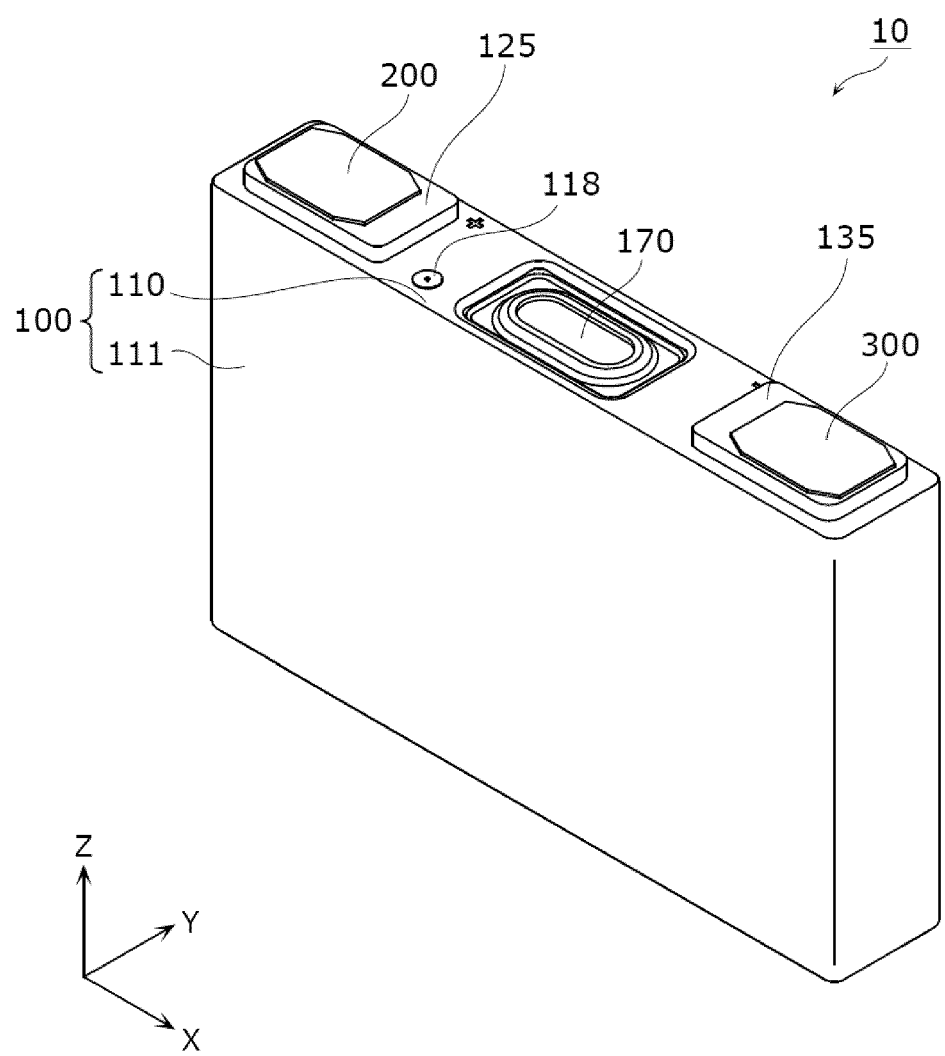
FIG. 1: A perspective view illustrating an external appearance of an energy storage device according to an embodiment.

FIG. 1 is a perspective view illustrating an external appearance of an energy storage device 10 according to the embodiment. FIG. 2 is an exploded perspective view of the energy storage device 10 according to the embodiment. FIG. 3 is an exploded perspective view of a lid plate structure 180 according to the embodiment. In FIG. 3, a positive electrode lead plate 145 and a negative electrode lead plate 155 to be joined to a positive electrode current collector 140 and a negative electrode current collector 150, respectively, provided to the lid plate structure 180 are illustrated in dotted lines.

Although a Z-axis direction is described as a vertical direction in FIG. 1 and succeeding diagrams for the convenience of explanation, the Z-axis is not necessarily in the vertical direction in actual manners of use.

The energy storage device 10 is a secondary battery which can be recharged and can discharge an electric current, and more specifically a nonaqueous electrolyte secondary battery such as a lithium ion secondary battery. The energy storage device 10 is applied to an electric vehicle (EV), a hybrid electric vehicle (HEV) or a plug-in hybrid electric vehicle (PHEV), for example. The energy storage device 10 is not limited to the nonaqueous secondary battery but may be a secondary battery other than a nonaqueous secondary battery, or a capacitor.

Figure 2:
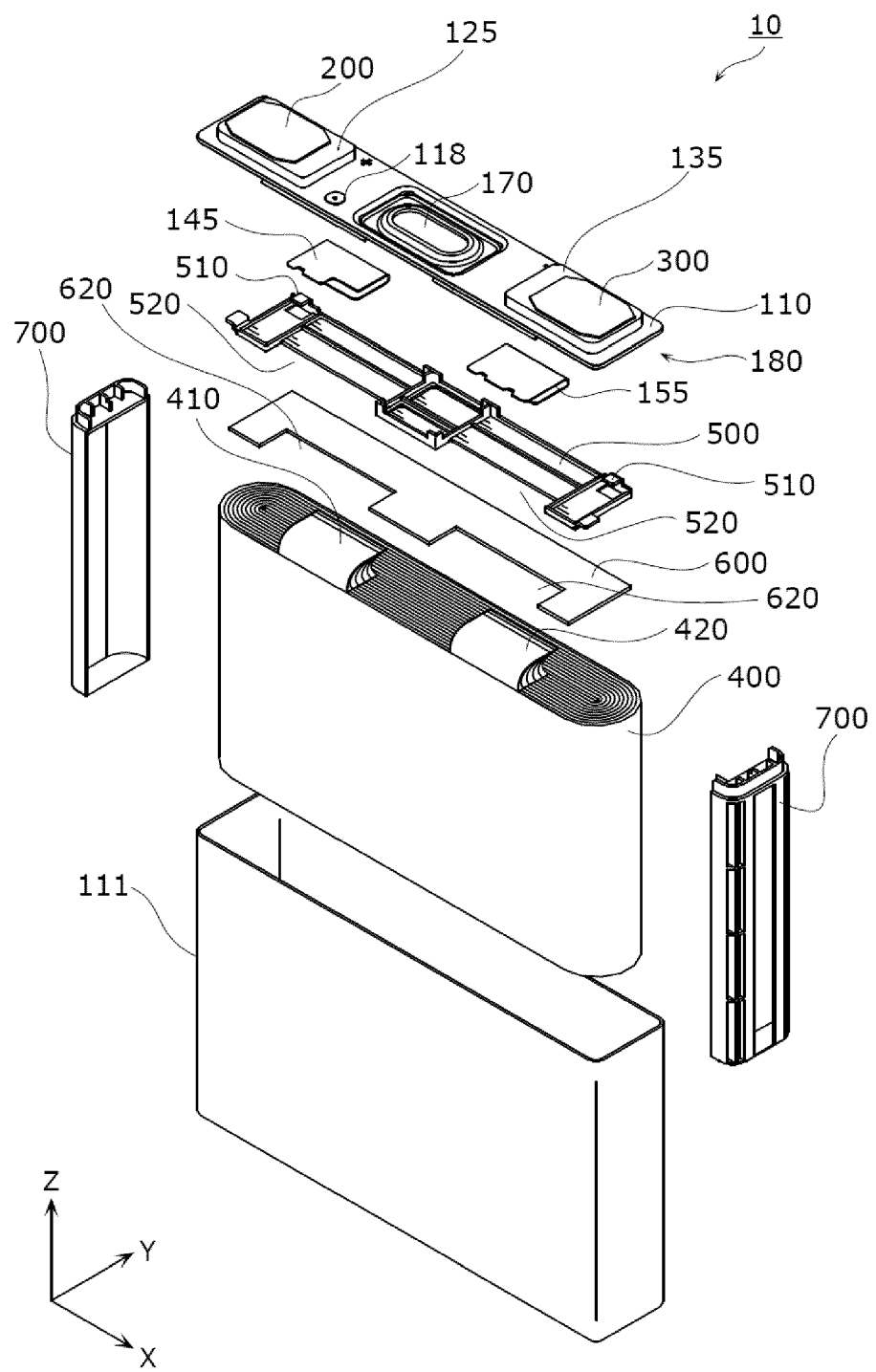
FIG. 2: An exploded perspective view of the energy storage device according to the embodiment.

As illustrated in FIGS. 1 and 2, the energy storage device 10 includes an electrode assembly 400 and a container 100 for housing the electrode assembly 400. In the embodiment, a lid plate structure 180 formed by disposing various elements on a lid plate 110 of the container 100 is disposed above the electrode assembly 400.

The lid plate structure 180 includes the lid plate 110 of the container 100, a positive electrode terminal 200, a negative electrode terminal 300, upper insulating members 125 and 135, lower insulating members 120 and 130, and the positive electrode current collector 140, and the negative electrode current collector 150.

The positive electrode terminal 200 is electrically connected to a positive electrode of the electrode assembly 400 by the positive electrode current collector 140. The negative electrode terminal 300 is electrically connected to a negative electrode of the electrode assembly 400 by the negative electrode current collector 150. The respective conductive members such as the positive electrode terminal 200 electrically connected to the electrode assembly 400 are insulated from the container 100 by the insulating members such as the lower insulating member 120.

Each of the upper insulating members 125 and 135 and the lower insulating members 120 and 130 is an insulating member at least a part of which is disposed between a wall portion of the container 100 and the conductive member. In the present embodiment, the respective insulating members are disposed along the lid plate 110 forming an upper wall portion out of six wall portions forming the container 100 having a substantially rectangular parallelepiped outer shape.

In addition to the above structure, the energy storage device 10 according to the present embodiment includes an upper spacer 500 and a shock-absorbing sheet 600 disposed between the lid plate structure 180 and the electrode assembly 400.

The upper spacer 500 is disposed between an end portion of the electrode assembly 400 provided with tab portions 410 and 420 and the lid plate 110. The upper spacer 500 has locked portions 510 to be locked to portions of the lid plate structure 180. In other words, the upper spacer 500 has the locked portions 510 to get caught on the portions of the lid plate structure 180.

Specifically, the entire upper spacer 500 is in a flat plate shape and has the two locked portions 510 and two opening portions 520 thorough which the tab portions 410 and 420 are inserted (through which the tab portions 410 and 420 pass). In the present embodiment, the opening portions 520 are formed in notch shapes in the upper spacer 500. The upper spacer 500 is made of material such as polycarbonate (PC), polypropylene (PP), polyethylene (PE), and polyphenylene sulfide resin (PPS) having an insulation property.

The upper spacer 500 serves as a member for directly or indirectly restricting upward movement of the electrode assembly 400 (toward the lid plate 110) or a member for preventing a short circuit between the lid plate structure 180 and the electrode assembly 400, for example. The upper spacer 500 has the two locked portions 510 and each of the two locked portions 510 is locked to a mounting portion 122 or 132 provided to the lid plate structure 180.

The shock-absorbing sheet 600 is a member which is made of highly-flexible and porous material such as foamed polyethylene, and serves as a shock-absorbing member between the electrode assembly 400 and the upper spacer 500. Similarly to the upper spacer 500, the shock-absorbing sheet 600 has two opening portions 620 through which the tab portions 410 and 420 are inserted (through which the tab portions 410 and 420 pass). The opening portions 620 are formed in notch shapes in the shock-absorbing sheet 600 in the present embodiment.

In the present embodiment, side spacers 700 are disposed between side faces of the electrode assembly 400 in a direction intersecting the direction (z-axis direction) in which the electrode assembly 400 and the lid plate 110 are arranged (opposite faces in an X-axis direction in the present embodiment) and an inner surface of the container 100. The side spacers 700 perform a function of restricting a position of the electrode assembly 400, for example. Similarly to the upper spacer 500, the side spacers 700 are made of material such as PC, PP, PE, and PPS having an insulation property, for example.

Figure 3:
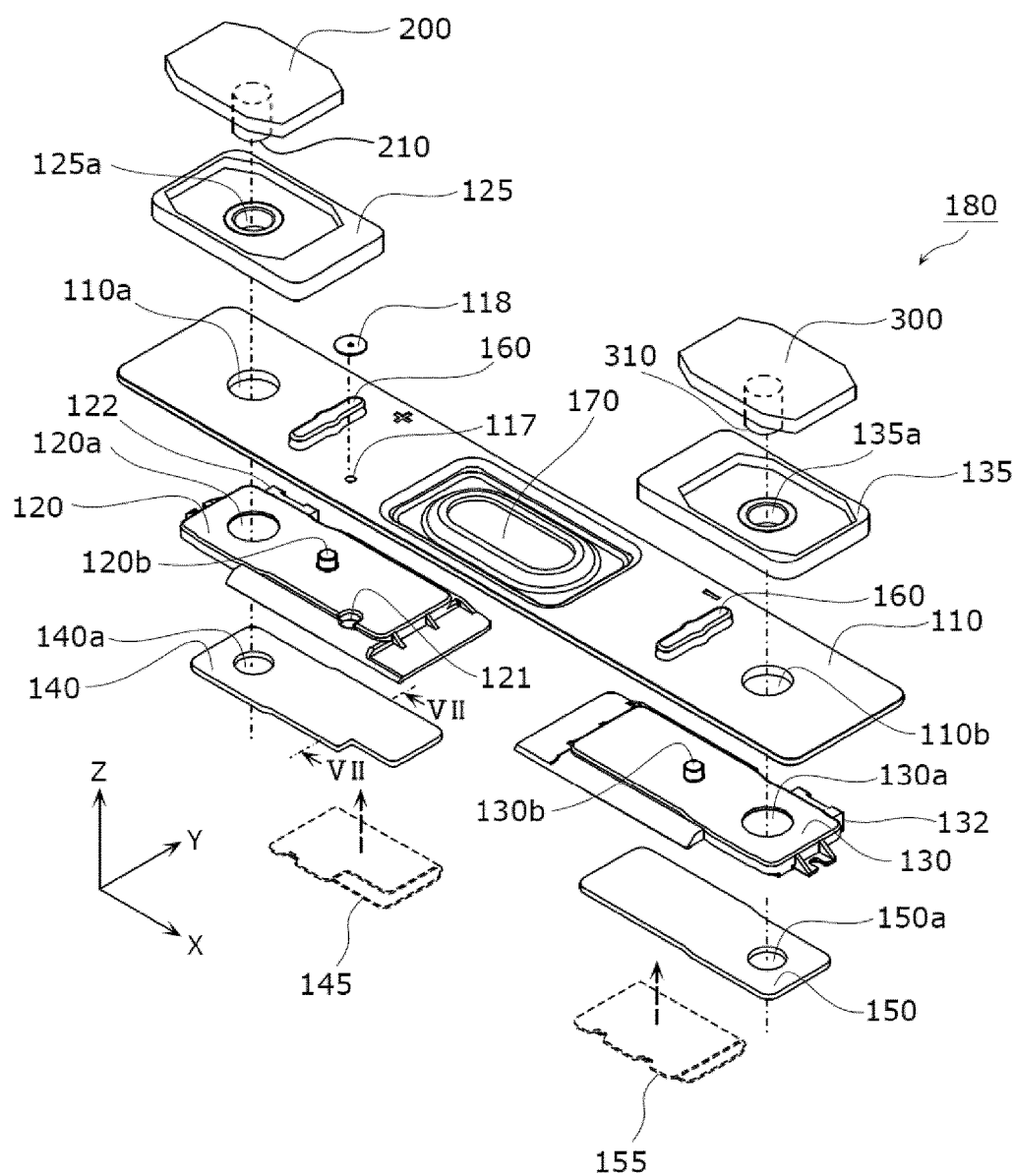
FIG. 3: An exploded perspective view of a lid plate structure according to the embodiment.

In addition to the components illustrated in FIGS. 1 to 3, the energy storage device 10 may include other components such as an insulating film for wrapping the electrode assembly 400 and a shock-absorbing sheet disposed between the electrode assembly 400 and a bottom face of the container 100 (main body 111). Electrolyte solution (nonaqueous electrolyte solution) is sealed in the container 100 of the energy storage device 10, though the electrolyte solution is not illustrated.

The container 100 is formed by the main body 111 in a rectangular cylindrical shape with a bottom and the lid plate 110 which is a plate-shaped member for closing an opening of the main body 111. The entire container 100 is in a rectangular parallelepiped shape and formed by the six wall portions as described above. Specifically, the container 100 includes the upper wall portion formed by the lid plate 110, the lower wall portion facing the upper wall portion, and the four side wall portions connecting the upper wall portion and the lower wall portion. In other words, the main body 111 forms the lower wall portion and the four side wall portions.

An inside of the container 100 can be sealed by welding the lid plate 110 and the main body 111 to each other after the electrode assembly 400 and the like are housed into the container 100. Although material of the lid plate 110 and the main body 111 are not particularly limited, weldable metal such as stainless steel, aluminum, aluminum alloys is preferable.

As illustrated in FIGS. 2 and 3, the lid plate 110 is provided with a safety valve 170, an electrolyte solution filling opening 117, through holes 110a and 110b, and two bulging portions 160. The safety valve 170 has a function of releasing gas inside the container 100 by opening when internal pressure of the container 100 increases.

The electrolyte solution filling opening 117 is a through hole from which the electrolyte solution is to be filled during manufacture of the energy storage device 10. As illustrated in FIGS. 1 to 3, an electrolyte solution filling plug 118 is disposed on the lid plate 110 to close the electrolyte solution filling opening 117. By filling the electrolyte solution into the container 100 from the electrolyte solution filling opening 117 and welding the electrolyte solution filling plug 118 to the lid plate 110 to close the electrolyte solution filling opening 117 during the manufacture of the energy storage device 10, the electrolyte solution is housed into the container 100. The electrolyte solution to be filled into the container 100 is not particularly limited and various kinds of electrolyte solution can be selected, as long as the electrolyte solution does not impair performance of the energy storage device 10. Moreover, by filling the electrolyte solution after reducing the pressure inside the container 100, for example, in filling the electrolyte solution from the electrolyte solution filling opening 117, it is possible to efficiently fill a necessary amount of electrolyte solution into the container 100.

Structural features of the electrolyte solution filling opening 117 formed in the energy storage device 10 according to the present embodiment will be described later by using FIGS. 5 to 7.

In the present embodiment, each of the two bulging portions 160 is provided to the lid plate 110 by forming portions of the lid plate 110 into bulging shapes and used for positioning of the upper insulating member 125 or 135, for example. A recessed portion (not shown) which is recessed upward is formed on a back side (side facing the electrode assembly 400) of the bulging portion 160 and an engaged portion 120b or 130b of the lower insulating member 120 or 130 is engaged with a portion of the recessed portion. In this way, the lower insulating members 120 and 130 are positioned and fixed to the lid plate 110 in this state.

The upper insulating member 125 is a member for electrically insulating the positive electrode terminal 200 and the lid plate 110 from each other and the lower insulating member 120 is a member for electrically insulating the positive electrode current collector 140 and the lid plate 110 from each other. The upper insulating member 135 is a member for electrically insulating the negative electrode terminal 300 and the lid plate 110 from each other and the lower insulating member 130 is a member for electrically insulating the negative electrode current collector 150 and the lid plate 110 from each other. The upper insulating members 125 and 135 are referred to as "upper packing", and the lower insulating members 120 and 130 are referred to as "lower packing", for example, in some cases. In other words, in the present embodiment, the upper insulating members 125 and 135 and the lower insulating members 120 and 130 also have functions of providing sealing between the electrode terminal (200 or 300) and the container 100.

The upper insulating members 125 and 135 and the lower insulating members 120 and 130 are made of material such as PC, PP, PE, and PPS having an insulation property similarly to the upper spacer 500, for example. At a position directly below the electrolyte solution filling opening 117 of the lower insulating member 120, a through hole 121 for guiding the electrolyte solution filled from the electrolyte solution filling opening 117 toward the electrode assembly 400 is formed.

The positive electrode terminal 200 is an electrode terminal electrically connected to the positive electrode of the electrode assembly 400 by the positive electrode current collector 140 and the negative electrode terminal 300 is the electrode terminal electrically connected to the negative electrode of the electrode assembly 400 by the negative electrode current collector 150. In other words, the positive electrode terminal 200 and the negative electrode terminal 300 are metal electrode terminals for leading electricity stored in the electrode assembly 400 out into a space outside the energy storage device 10 and leading electricity into a space inside the energy storage device 10 to store the electricity in the electrode assembly 400. The positive electrode terminal 200 and the negative electrode terminal 300 are made of aluminum, an aluminum alloy, or the like.

The positive electrode terminal 200 is provided with a fastening portion 210 for fastening the container 100 and the positive electrode current collector 140 to each other and the negative electrode terminal 300 is provided with a fastening portion 310 for fastening the container 100 and the negative electrode current collector 150 to each other.

The fastening portion 210 is a member (rivet) formed to extend downward from the positive electrode terminal 200 and inserted through a through hole 140a in the positive electrode current collector 140 and swaged. To put it concretely, the fastening portion 210 is inserted through a through hole 125a in the upper insulating member 125, the through hole 110a in the lid plate 110, a through hole 120a in the lower insulating member 120, and the through hole 140a in the positive electrode current collector 140 and swaged. In this way, the positive electrode terminal 200 and the positive electrode current collector 140 are electrically connected and the positive electrode current collector 140 is fixed to the lid plate 110 together with the positive electrode terminal 200, the upper insulating member 125, and the lower insulating member 120.

The fastening portion 310 is a member (rivet) formed to extend downward from the negative electrode terminal 300 and inserted through a through hole 150a in the negative electrode current collector 150 and swaged. To put it concretely, the fastening portion 310 is inserted through a through hole 135a in the upper insulating member 135, the through hole 110b in the lid plate 110, a through hole 130a in the lower insulating member 130, and the through hole 150a in the negative electrode current collector 150 and swaged. In this way, the negative electrode terminal 300 and the negative electrode current collector 150 are electrically connected and the negative electrode current collector 150 is fixed to the lid plate 110 together with the negative electrode terminal 300, the upper insulating member 135, and the lower insulating member 130.

The fastening portion 210 may be formed integrally with the positive electrode terminal 200 or the fastening portion 210 formed as a separate part from the positive electrode terminal 200 may be fixed to the positive electrode terminal 200 by a method such as swaging and welding. This holds true for a relationship between the fastening portion 310 and the negative electrode terminal 300.

The positive electrode current collector 140 is the member disposed between the electrode assembly 400 and the container 100 to electrically connect the electrode assembly 400 and the positive electrode terminal 200. The positive electrode current collector 140 is made of aluminum, an aluminum alloy, or the like. In the present embodiment, the positive electrode current collector 140 is electrically connected to the positive tab portion 410 of the electrode assembly 400 by the positive electrode lead plate 145.

The negative electrode current collector 150 is the member disposed between the electrode assembly 400 and the container 100 to electrically connect the electrode assembly 400 and the negative electrode terminal 300. The negative electrode current collector 150 is made of copper, a copper alloy, or the like. In the present embodiment, the negative electrode current collector 150 is electrically connected to the negative tab portion 420 of the electrode assembly 400 by the negative electrode lead plate 155.

Details of connection portions between the current collectors and the tab portions by the lead plates will be described later by using FIG. 7.

Figure 4:
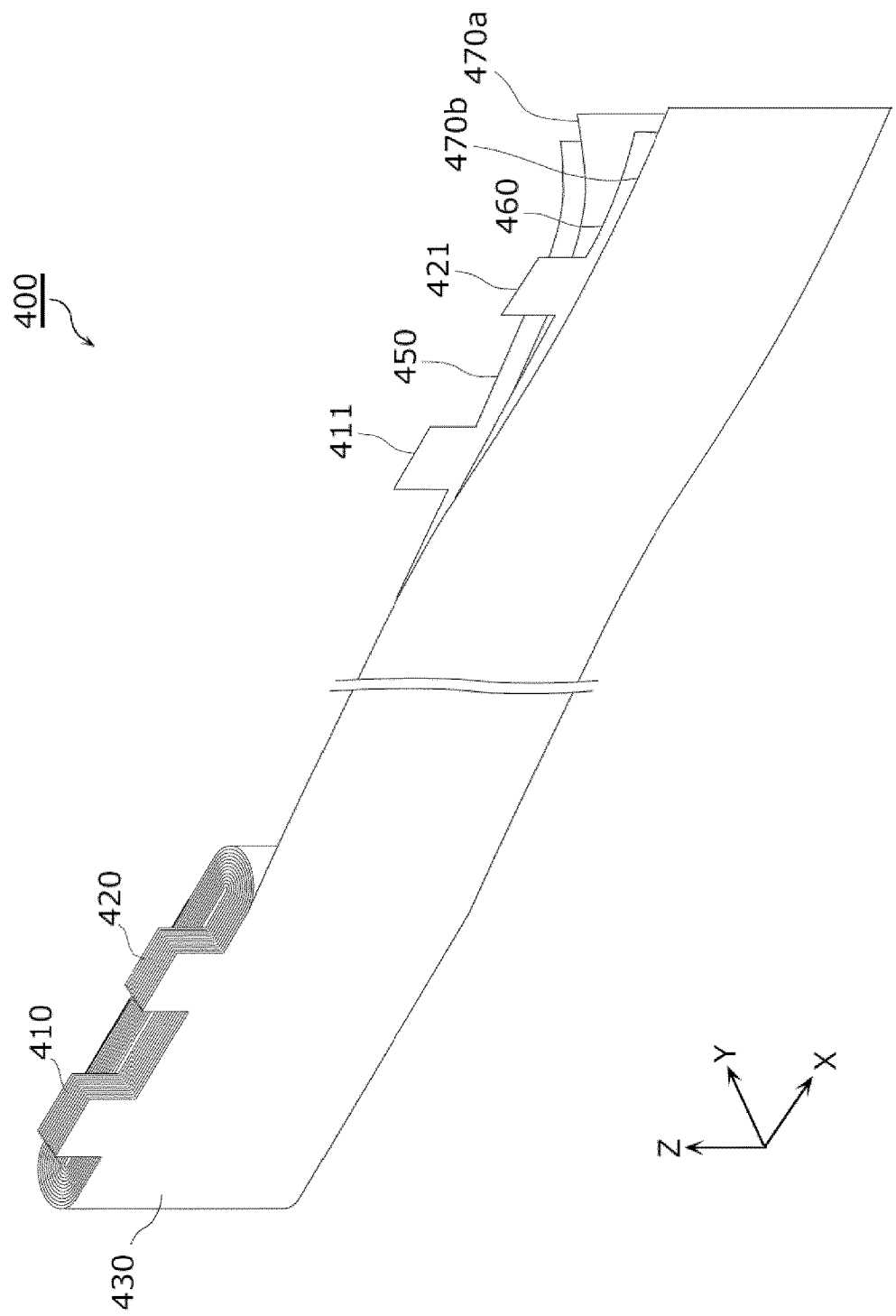
FIG. 4: A perspective view illustrating a structure of an electrode assembly according to the embodiment.

Next, a structure of the electrode assembly 400 will be described by using FIG. 4. FIG. 4 is a perspective view illustrating the structure of the electrode assembly 400 according to the embodiment. FIG. 4 illustrates a wound state of the electrode assembly 400 in a partially developed manner.

The electrode assembly 400 is a power generating element which can store electricity and formed by alternately layering and winding the positive electrode 450, the negative electrode 460, separators 470a, and 470b. In other words, the electrode assembly 400 is formed by layering the positive electrode 450, the separator 470a, the negative electrode 460, and the separator 470b in this order and winding them to obtain an elongated circular section.

The positive electrode 450 is an electrode plate formed by forming a positive active material layer on a surface of a positive substrate layer which is a long band-shaped sheet of metal foil made of aluminum, an aluminum alloy, or the like. As positive active material used for the positive active material layer, known material can be used suitably, if the positive active material can store and release lithium ions. For example, as the positive active material, it is possible to use lithium-transition metal oxide or the like, e.g., a polyanion compound such as $LiMPO_4$, $LiMSiO_4$, $LiMBOs_3$ (M represents one or more transition metal elements selected from Fe, Ni, Mn, Co, and the like), a spinel compound such as lithium titanate and lithium manganate, and $LiMO_2$ (M represents one or more transition metal elements selected from Fe, Ni, Mn, Co, and the like).

The negative electrode 460 is an electrode plate formed by forming a negative active material layer on a surface of a negative substrate layer which is a long band-shaped sheet of metal foil made of copper, a copper alloy, or the like. As negative active material used for the negative active material layer, known material can be used suitably, if the negative active material can store and release lithium ions. For example, as the negative active material, it is possible to use an alloy, carbon material (e.g., graphite, hardly graphitizable carbon, easily graphitizable carbon, low-temperature sintered carbon, and amorphous carbon), metal oxide, lithium metal oxide ($Li_4Ti_5O_{12}$ or the like), polyphosphate compound, and the like, which can store and release lithium, besides lithium metal and a lithium alloy (a lithium metal containing alloy such as a lithium-aluminum, lithium-lead, lithium-tin, lithium-aluminum-tin, lithium-gallium, or wood's alloy).

The separators 470a and 470b are microporous sheets made of resin. As material of the separators 470a and 470b used for the energy storage device 10, known material can be used suitably, as long as the material does not impair performance of the energy storage device 10.

The positive electrode 450 has a plurality of protruding portions 411 protruding outward from one end in a direction of a winding axis. Similarly, the negative electrode 460 has a plurality of protruding portions 421 protruding outward from one end in the direction of the winding axis. The plurality of protruding portions 411 and the plurality of protruding portions 421 are portions (active material uncoated portions) which are not coated with the active material and on which substrate layers are exposed.

The winding axis refers to an imaginary axis which serves as a central axis when the positive electrode 450, the negative electrode 460, and the like are wound and is a straight line parallel to a direction of the Z-axis passing through a center of the electrode assembly 400 in the present embodiment.

The plurality of protruding portions 411 and the plurality of protruding portions 421 are disposed at the ends on the same side in the direction of the winding axis (ends on a positive side in the z-axis direction in FIG. 4) and layered at predetermined positions of the electrode assembly 400 when the positive electrode 450 and the negative electrode 460 are layered. To put it concretely, the plurality of protruding portions 411 are layered at the predetermined position in a circumferential direction at the one end in the direction of the winding axis when the positive electrode 450 is layered by winding. The plurality of protruding portions 421 are layered at the predetermined position in a circumferential direction, which is different from the layered position of the plurality of protruding portions 411, at the one end in the direction of the winding axis when the negative electrode 460 is layered by winding.

As a result, the tab portion 410 formed by layering the plurality of protruding portions 411 and the tab portion 420 formed by layering the plurality of protruding portions 421 are formed on the electrode assembly 400. The tab portion 410 is gathered toward a center in a layered direction, for example, and joined to the positive electrode lead plate 145 by ultrasonic welding, for example. The tab portion 420 is gathered toward the center in the layered direction, for example, and joined to the negative electrode lead plate 155 by ultrasonic welding, for example. The positive electrode lead plate 145 joined to the tab portion 410 is joined to the positive electrode current collector 140 and the negative electrode lead plate 155 joined to the tab portion 420 is joined to the negative electrode current collector 150.

The tab portions (410, 420) are portions through which electricity is lead into and out of the electrode assembly 400 and may be given other names such as "leads/lead portions" and "current collecting portions" in some cases.

Here, the tab portion 410 is formed by layering the protruding portions 411, where the substrate layer is exposed, and therefore does not contribute to power generation. Similarly, the tab portion 420 is formed by layering the protruding portions 421, where the substrate layer is exposed, and therefore does not contribute to the power generation. On the other hand, a portion of the electrode assembly 400 excluding the tab portions 410 and 420 is formed by layering portions formed by coating the substrate layers with the active material and therefore contributes to the power generation. This portion will be hereinafter referred to as the "power generating portion 430". In other words, in the present embodiment, it can be said that the tab portions 410 and 420 protrude from portions of an end portion of the power generating portion 430 which is a main assembly portion of the electrode assembly 400.

Next, structural features of the electrolyte solution filling opening 117 provided to the energy storage device 10 according to the present embodiment will be described by using FIGS. 5 to 7.

Figure 5:
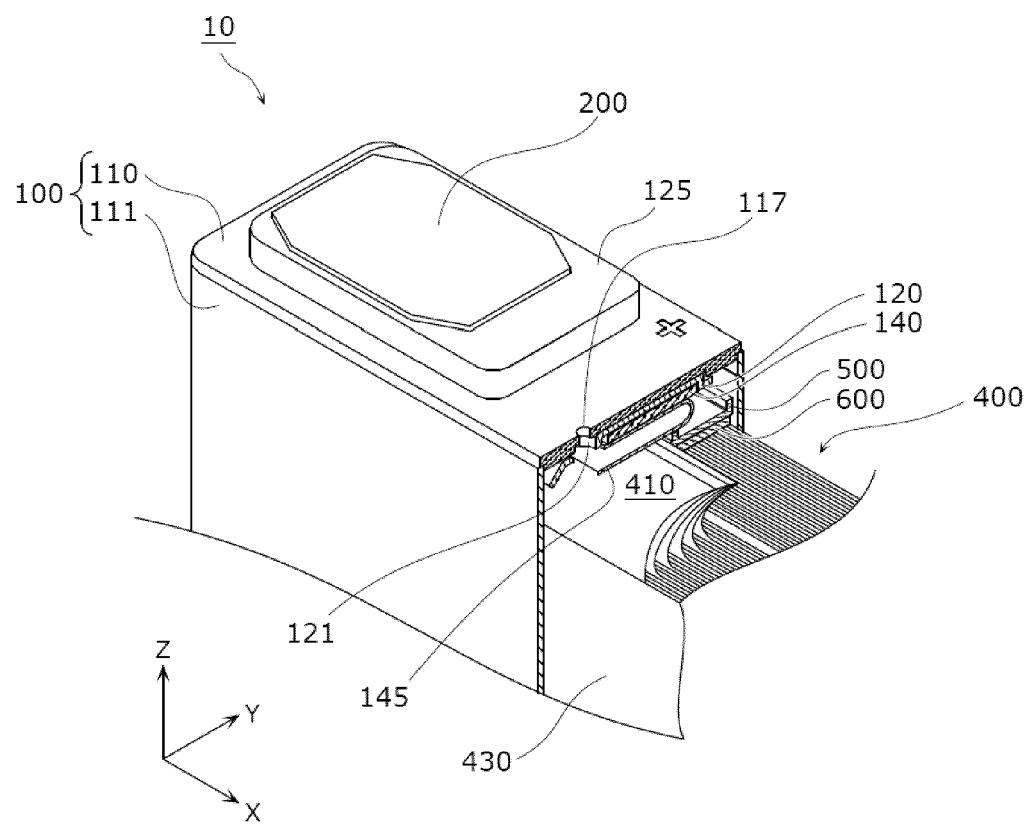
FIG. 5: A perspective view illustrating an electrolyte solution filling opening and a structure around the opening according to the embodiment.
Figure 6:
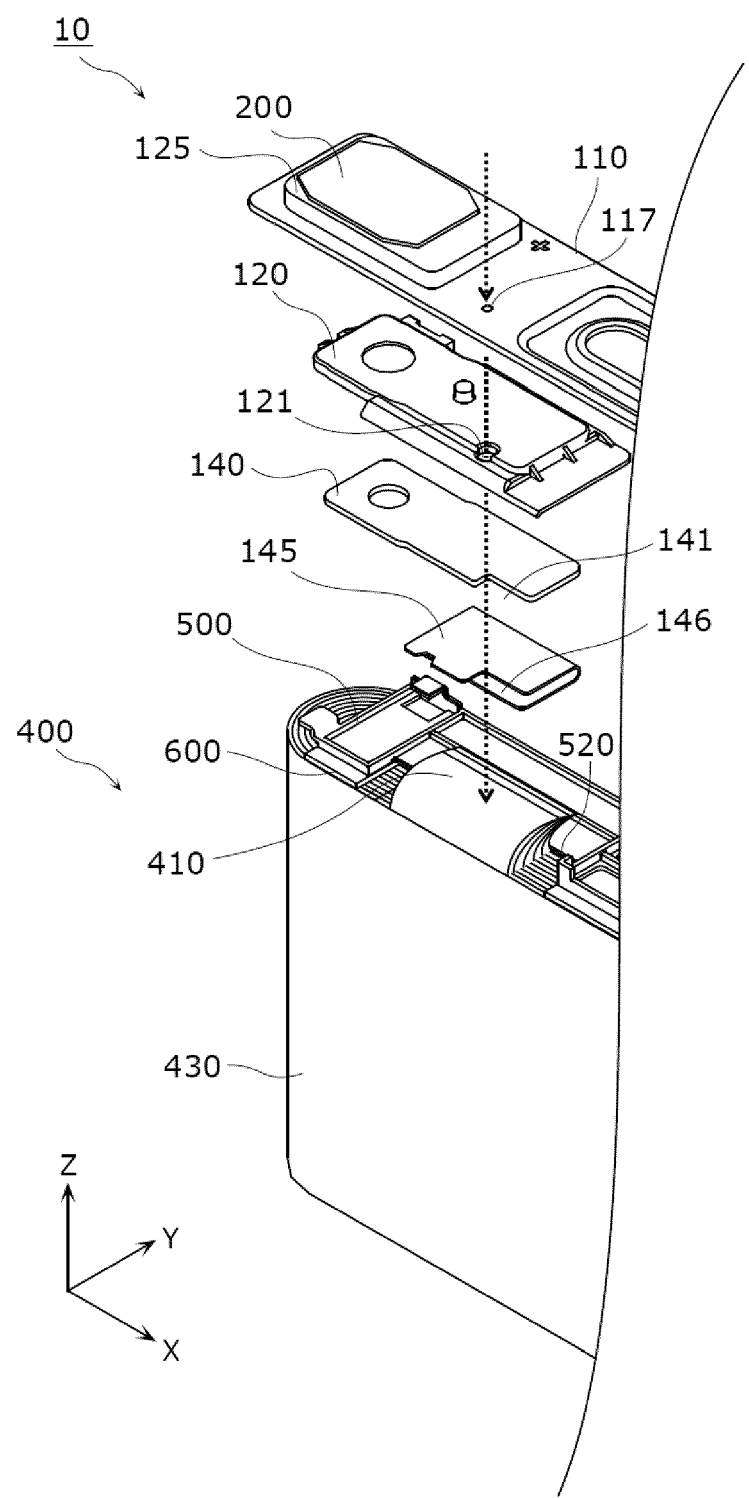
FIG. 6: An exploded perspective view illustrating the electrolyte solution filling opening and the structure around the opening according to the embodiment.

FIG. 5 is a perspective view illustrating the electrolyte solution filling opening 117 and a structure around the opening 117 according to the embodiment and FIG. 6 is an exploded perspective view illustrating the electrolyte solution filling opening 117 and the structure around the opening according 117 according to the embodiment. In FIG. 5, in order to illustrate a structure from the electrolyte solution filling opening 117 to the tab portion 410 in the container 100, components other than the electrode assembly 400 are cut along a Y-Z plane passing through the electrolyte solution filling opening 117 and only portions of the components on a back side (a negative side in the X-axis direction) of the section are illustrated. FIG. 6 illustrates only a portion of the energy storage device 10 on a side of the positive electrode terminal 200 where the electrolyte solution filling opening 117 is formed and does not illustrate a portion of the energy storage device 10 on a side of the negative electrode terminal 300. Moreover, in FIGS. 5 and 6, the electrolyte solution filling plug 118 for closing the electrolyte solution filling opening 117 is not illustrated.

Figure 7:
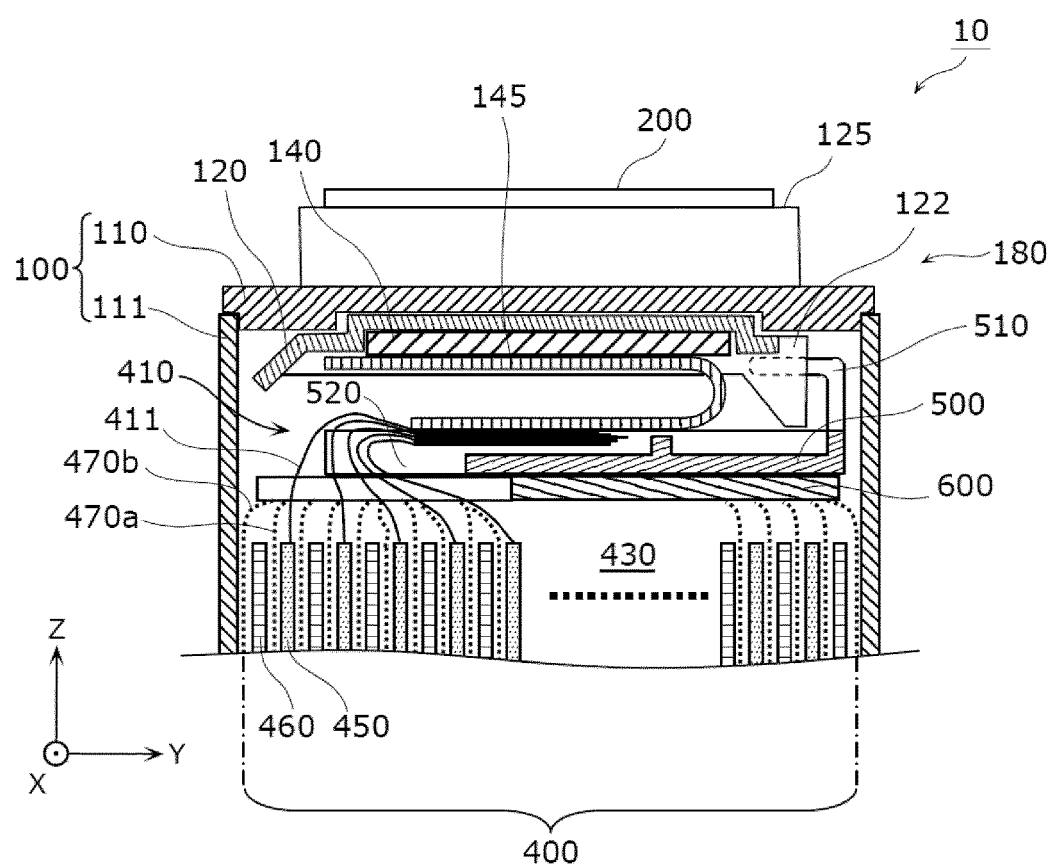
FIG. 7: A sectional schematic diagram illustrating an upper end portion of the electrode assembly and a structure around the portion according to the embodiment.

FIG. 7 is a sectional schematic diagram illustrating the upper end portion of the electrode assembly 400 and a structure around the portion according to the embodiment. FIG. 7 illustrates a section of a portion of the energy storage device 10 taken along a Y-Z plane passing through line VII-VII in FIG. 3 and does not illustrate the side spacer 700 (see FIG. 2) on the negative side in the X-axis direction. The electrode assembly 400 is illustrated schematically.

As illustrated in FIGS. 5 and 6, in the energy storage device 10 according to the present embodiment, the electrolyte solution filling opening 117 from which the electrolyte solution is to be filled into the container 100 is formed in a position of the wall portion of the container 100 and facing the tab portion 410 of the electrode assembly 400. In the present embodiment, the electrolyte solution filling opening 117 is formed in the lid plate 110 forming the upper wall portion of the container 100. In the present embodiment, when the container 100 is seen in the direction (Z-axis direction) in which the electrode assembly 400 and the wall portion (lid plate 110) formed with the electrolyte solution filling opening 117 are arranged, the electrolyte solution filling opening 117 is disposed in such a position as to overlap the tab portion 410.

Because the electrolyte solution filling opening 117 is disposed in the position facing the tab portion 410 in this manner, the electrolyte solution filled from the electrolyte solution filling opening 117 immediately reaches the tab portion 410. The tab portion 410 is the portion formed by layering the portion of the substrate of the positive electrode 450 and not coated with the positive active material (active material uncoated portion) as described above. A portion of the tab portion 410 is joined to the positive electrode lead plate 145. Therefore, the electrolyte solution filled from the electrolyte solution filling opening 117 disposed in the position facing the tab portion 410 goes down the tab portion and efficiently penetrates the electrode assembly 400 (more specifically, the active material layers of the positive electrode 450 and the negative electrode 460 and the separators 470a and 470b provided to the electrode assembly 400).

Moreover, at the end portion of the electrode assembly 400 other than the tab portion 410 (i.e., the upper end portion of the power generating portion 430 other than the portion provided with the tab portion 410), end edges of the separators 470*a* and 470*b* may be bent or a structure may be disposed to take measures against entry of foreign matters.

In the present embodiment, as illustrated in FIGS. 2 and 7, the upper spacer 500 and the shock-absorbing sheet 600 are disposed to cover the upper end portion of the power generating portion 430 other than the portions provided with the tab portions 410 and 420. Therefore, even if foreign matters such as minute metal chips are there in the container 100, entry of the foreign matters into the power generating portion 430 through clearances between the end edges of the separators 470*a* and 470*b* arranged in the layered direction is suppressed by the upper spacer 500 or the shock-absorbing sheet 600. In other words, in the energy storage device 10 according to the present embodiment, the electrolyte solution can efficiently penetrate the electrode assembly 400 and the entry of the foreign matters into the electrode assembly 400 can be suppressed.

In the energy storage device 10 according to the present embodiment, the through hole 121 is formed in a position between the electrolyte solution filling opening 117 and the tab portion 410 of the lower insulating member 120 disposed between the positive electrode current collector 140 and the lid plate 110.

In other words, the lower insulating member 120 for electrically insulating the positive electrode current collector 140 and the lid plate 110 provided with the electrolyte solution filling opening 117 from each other is disposed in such a manner as not to obstruct a flow of the electrolyte solution filled from the electrolyte solution filling opening 117.

Here, in the present embodiment, the electrolyte solution filling opening 117 is disposed in the position facing the tab portion 410. Therefore, the lower insulating member 120 for insulating the positive electrode current collector 140 electrically connected to the tab portion 410 and the lid plate 110 from each other exists in such a position as to overlap the electrolyte solution filling opening 117 when seen from a direction in which the electrolyte solution is filled. In this case, by forming the through hole 121 in the position of the lower insulating member 120 between the electrolyte solution filling opening 117 and the tab portion 410, it is possible to allow the electrolyte solution filled from the electrolyte solution filling opening 117 to reach the tab portion 410 through the through hole 121. In other words, it is possible to secure a straight flow path for the electrolyte solution from the electrolyte solution filling opening 117 to the tab portion 410.

Furthermore, in the energy storage device 10 according to the present embodiment, the opening portion 520 through which the tab portion 410 is to be inserted is formed in the upper spacer 500 disposed between the end portion of the electrode assembly 400 provided with the tab portion 410 and the lid plate 110.

In other words, in order to cause the upper spacer 500 to perform functions of restricting the position of the electrode assembly 400, preventing the short circuit between the electrode assembly 400 and the lid plate structure 180, and suppressing the entry of the foreign matters into the electrode assembly 400, the upper spacer 500 is disposed between the end portion of the electrode assembly 400 provided with the tab portion 410 and the lid plate 110. Even if the upper spacer 500 is disposed in this position, the tab portion 410 is exposed to the electrolyte solution filling opening 117 by being inserted through the opening portion 520 provided to the upper spacer 500. Therefore, in the energy storage device 10 according to the present embodiment, it is possible to cause the electrolyte solution filled from the electrolyte solution filling opening 117 to immediately reach the tab portion 410 while obtaining the above effects exerted by the upper spacer 500. As a result, the electrolyte solution efficiently penetrates the electrode assembly 400.

Moreover, by disposing the upper spacer 500 between the power generating portion 430 of the electrode assembly 400 and the lid plate 110, it is possible to bring the power generating portion 430 and the lid plate 110 close to each other with the upper spacer 500 interposed therebetween. In this way, it is possible to increase a proportion of the electrode assembly 400 to a capacity of the container 100, for example.

In the present embodiment, the positive electrode current collector 140 and the positive electrode lead plate 145 also have structures for letting the electrolyte solution filled from the electrolyte solution filling opening 117 through. To put it concretely, as illustrated in FIG. 6, the positive electrode current collector 140 has a notch portion 141 formed by notching an end edge of the positive electrode current collector 140 inward and the positive electrode lead plate 145 has a notch portion 146 formed by notching an end edge of the positive electrode lead plate 145 inward.

In other words, the electrolyte solution filled from the electrolyte solution filling opening 117 mainly passes through the through hole 121 in the lower insulating member 120, the notch portion 141 of the positive electrode current collector 140, and the notch portion 146 of the positive electrode lead plate 145 in this order and reaches the tab portion 410.

In this manner, in the present embodiment, the notch portions 141 and 146 are formed at the positive electrode current collector 140 and the positive electrode lead plate 145 as structures for avoiding obstruction to the flow of the electrolyte solution. In this way, for example, it is unnecessary to finely adjust positions of the positive electrode current collector 140 and the positive electrode lead plate 145 in order to secure the straight flow path for the electrolyte solution from the electrolyte solution filling opening 117 to the tab portion 410.

Here, the positive electrode lead plate 145 according to the present embodiment has a U-shaped section, as shown in FIG. 7, for example. The upper spacer 500 separates a joint between the tab portion 420 and the positive electrode lead plate 145, and the power generating portion 430 of the electrode assembly 400 from each other and the tab portion 410 is inserted through and disposed in the opening portion 520 provided to the upper spacer 500. The above-described structure is manufactured by the following procedure, for example.

An end portion (first end portion) of the positive electrode lead plate 145 in a flat plate shape and the tab portion 410 of the electrode assembly 400 are joined to each other by ultrasonic welding, for example. Furthermore, an end portion (second end portion) of the positive electrode lead plate 145 on an opposite side from the first end portion is joined to the positive electrode current collector 140 integrated into the lid plate structure 180 by laser welding, for example. Then, the positive electrode lead plate 145 is deformed into the U-shape by being bent at a predetermined position between the first end portion and the second end portion. As a result, as shown in FIG. 7, a connection structure of the tab portion 410 of the electrode assembly 400 and the positive electrode current collector 140 by the positive electrode lead plate 145 having the U-shaped section is formed. Then, the upper spacer 500 is inserted between the power generating portion 430 of the electrode assembly 400 and the lid plate structure 180.

The negative electrode lead plate 155 and the tab portion 420 are joined to each other when the positive electrode lead plate 145 and the tab portion 410 are joined to each other and the negative electrode lead plate 155 and the negative electrode current collector 150 are joined to each other when the positive electrode lead plate 145 and the positive electrode current collector 140 are joined to each other. Moreover, when the positive electrode lead plate 145 in the shape of the flat plate is deformed into the U shape, the negative electrode lead plate 155 in a shape of a flat plate is deformed into a U shape. In other words, the structure around the negative electrode lead plate 155 is similar to the structure around the positive electrode lead plate 145. In other words, the tab portion 420 of the electrode assembly 400 and the negative electrode current collector 150 are electrically connected to each other by the negative electrode lead plate 155 (see FIG. 2, for example) having the U-shaped section. Moreover, the upper spacer 500 separates a joint between the tab portion 420 and the negative electrode lead plate 155, and the power generating portion 430 of the electrode assembly 400 from each other and the tab portion 420 is inserted through and disposed in the opening portion 520 provided to the upper spacer 500.

By connecting the electrode assembly 400, the positive electrode current collector 140, and the negative electrode current collector 150 by the positive electrode lead plate 145 and the negative electrode lead plate 155 in this manner, lengths of the tab portions 410 and 420 (lengths in the direction of the winding axis (Z-axis direction)) of the electrode assembly 400 can be relatively short.

In other words, widths of the electrode plates of the positive electrode 450 and the negative electrode 460 (lengths in the direction of the winding axis (Z-axis direction)) required to manufacture the electrode assembly 400 can be relatively short. This is advantageous from a viewpoint of manufacturing efficiency of the electrode assembly 400, for example.

The electrode assembly 400 according to the present embodiment is formed by winding the positive electrode 450 and the negative electrode 460 (see FIG. 4). The electrolyte solution filling opening 117 is formed in the lid plate 110 positioned in the direction of the winding axis of the electrode assembly 400 of the container 100.

Therefore, for example, the electrolyte solution can penetrate the inside of the electrode assembly 400 from the tab portion 410 and the electrolyte solution accumulating on a bottom of the container 100 (on the lower wall portion facing the lid plate 110) can penetrate the inside of the electrode assembly 400 from an end portion on an opposite side from the tab portion in the direction of the winding axis. This is advantageous from a viewpoint of efficient penetration of the electrolyte solution into the electrode assembly 400.

(Other Embodiments)

The energy storage device according to the present invention has been described above based on the embodiment. However, the present invention is not limited to the above embodiment. Various modifications to the embodiment, which a person skilled in the art can think of, and modes formed by combining the plurality of components described above are included in a scope of the invention without departing from the gist of the invention.

For example, the number of electrode assembly/assemblies 400 provided to the energy storage device 10 is not limited to one, but two or more. If an energy storage device 10 includes a plurality of electrode assemblies 400, it is possible to reduce dead spaces in corner portions of a container 100 as compared with the case where the single electrode assembly 400 is housed in the container 100 of the same volume (capacity). Therefore, the proportion of the electrode assemblies 400 to the capacity of the container 100 can be increased and capacity of the energy storage device 10 can be increased.

Moreover, the electrode assembly 400 provided to the energy storage device 10 does not necessarily have to be of a winding type. An energy storage device 10 may include a layered-type electrode assembly formed by layering electrode plates in flat plate shapes, for example. An energy storage device 10 may include an electrode assembly having a bellows-shaped layered structure formed by accordion-folding long band-shaped electrode plates, for example.

A positional relationship between the positive tab portion 410 and the negative tab portion 420 provided to the electrode assembly 400 is not particularly limited. For example, in a winding-type electrode assembly 400, a tab portion 410 and a tab portion 420 may be disposed on opposite sides from each other in a direction of a winding axis. If an energy storage device 10 includes a layered-type electrode assembly, a positive tab portion and a negative tab portion may protrude in different directions when seen from a layered direction.

Although the electrolyte solution filling opening 117 is disposed at the position facing the positive tab portion 410 of the electrode assembly 400 in the above embodiment, the electrolyte solution filling opening 117 may be disposed at a position facing the negative tab portion 420 of the electrode assembly 400. In other words, if the electrolyte solution filling opening 117 is provided at a position facing a portion which is provided to the electrode assembly 400 having a layered structure of the positive electrode 450 and the negative electrode 460 and which is to be electrically connected to an outside, electrolyte solution can efficiently penetrate an inside of the electrode assembly 400.

In the container 100, the electrolyte solution filling opening 117 may be formed in the wall portion other than the lid plate 110. For example, assuming that the tab portion 410 or 420 is disposed in such an attitude as to face a lower wall portion (wall portion forming a bottom face of the main assembly 111) of the container 100, the electrolyte solution filling opening 117 may be formed in a position facing the tab portion 410 or 420. If the electrolyte solution filling opening 117 is disposed in the lower wall portion, an electrode terminal electrically connected to the tab portion 410 or 420 facing the electrolyte solution filling opening 117 may be fixed to the lower wall portion or may be fixed to an upper wall portion (lid plate 110).

A shape of the electrolyte solution filling opening 117 is not especially limited and may be selected from various shapes such as a circular shape, angular shape, and slit shape according to a shape of a nozzle used for electrolyte solution filling, for example. Regarding size of the electrolyte solution filling opening 117, suitable size may be selected from a viewpoint of electrolyte solution filling efficiency or maintenance of strength of the lid plate 110.

Although the lower insulating member 120 is disposed directly below the electrolyte solution filling opening 117 in the above embodiment, the position where the lower insulating member 120 is disposed is not particularly limited. In other words, if the lower insulating member 120 is disposed not directly below the electrolyte solution filling opening 117, the through hole 121 need not be formed in the lower insulating member 120 and the lower insulating member 120 can be manufactured easily.

INDUSTRIAL APPLICABILITY

The present invention can be applied to an energy storage device such as a lithium ion secondary battery.

The invention claimed is:

1. An energy storage device, comprising:
    an electrode assembly;
    a container for housing the electrode assembly,
        wherein an electrolyte solution filling opening, from which an electrolyte solution is to be filled into the container, is formed in a position of a wall portion of the container and facing a tab portion of the electrode assembly;
    a current collector disposed in the container and electrically connected to the tab portion; and
    an insulating member disposed between the current collector and the wall portion of the container,
    wherein a through hole is formed in a position of the insulating member and between the electrolyte solution filling opening and the tab portion.

2. The energy storage device according to claim 1, further comprising a spacer disposed between an end portion of the electrode assembly provided with the tab portion and the wall portion of the container,
    wherein the spacer includes an opening portion through which the tab portion is inserted.

3. The energy storage device according to claim 1, wherein the electrode assembly is formed by winding an electrode, and
    wherein the electrolyte solution filling opening is formed in the wall portion of the container and is positioned in a direction of a winding axis of the electrode assembly.

4. An energy storage device, comprising:
    an electrode assembly; and
    a container for housing the electrode assembly,
        wherein an electrolyte solution filling opening, from which an electrolyte solution is to be filled into the container, is formed in a position of a wall portion of the container and facing a tab portion of the electrode assembly, and
        wherein the electrode assembly is formed by winding an electrode, and the electrolyte solution filling opening is formed in the wall portion of the container and is positioned in a direction of a winding axis of the electrode assembly.

5. The energy storage device according to claim 4, further comprising:
    a current collector disposed in the container; and
    an insulating member disposed between the current collector and the wall portion of the container,
    wherein a through hole is formed in a position of the insulating member and between the electrolyte solution filling opening and the tab portion.

6. The energy storage device according to claim 4, further comprising a spacer disposed between an end portion of the electrode assembly provided with the tab portion and the wall portion of the container,
    wherein the spacer includes an opening portion through which the tab portion is inserted.

7. An energy storage device, comprising:
    an electrode assembly; and
    a container for housing the electrode assembly,
        wherein the electrode assembly includes a power generating portion and a tab portion,
        wherein an electrolyte solution filling opening, from which an electrolyte solution is to be filled into the container, is formed in a position of a wall portion of the container and facing the tab portion, and
        wherein the tab portion is disposed between the electrolyte solution filling opening and the power generating portion.

8. The energy storage device according to claim 7, further comprising:
    a current collector disposed in the container and electrically connected to the tab portion; and
    an insulating member disposed between the current collector and the wall portion of the container,
    wherein a through hole is formed in a position of the insulating member and between the electrolyte solution filling opening and the tab portion.

9. The energy storage device according to claim 7, further comprising a spacer disposed between an end portion of the electrode assembly provided with the tab portion and the wall portion of the container,
    wherein the spacer includes an opening portion through which the tab portion is inserted.

10. The energy storage device according to claim 7, wherein the electrode assembly is formed by winding an electrode, and the electrolyte solution filling opening is formed in the wall portion of the container and is positioned in a direction of a winding axis of the electrode assembly.

11. The energy storage device according to claim 7, further comprising:
    a current collector disposed in the container; and
    an insulating member disposed between the current collector and the wall portion of the container.

12. The energy storage device according to claim 11, wherein a through hole is formed in a position of the insulating member.

13. The energy storage device according to claim 12, wherein the through hole is formed between the electrolyte solution filling opening and the tab portion.

14. The energy storage device according to claim 11, wherein a through hole is formed between the electrolyte solution filling opening and the tab portion.

15. The energy storage device according to claim 7, further comprising:
    an insulating member disposed on the wall portion of the container,
    wherein a through hole is formed in a position of the insulating member.

16. The energy storage device according to claim 15, wherein the through hole is formed between the electrolyte solution filling opening and the tab portion.

17. The energy storage device according to claim 7, further comprising a spacer disposed between the electrode assembly provided with the tab portion and the wall portion of the container.

18. The energy storage device according to claim 17, wherein the spacer includes an opening portion through which the tab portion is inserted.

19. The energy storage device according to claim 7, wherein the electrolyte solution filling opening, the tab portion, and the power generating portion are arranged in this order in a direction in which the electrolyte solution filling opening faces the tab portion.

* * * * *